US 8,265,058 B2

(12) United States Patent
Chen et al.

(10) Patent No.: US 8,265,058 B2
(45) Date of Patent: Sep. 11, 2012

(54) METHOD AND AN APPARATUS FOR ROUTE SELECTION IN ROUTING PROTOCOLS

(75) Inventors: Enke Chen, San Jose, CA (US); Jennifer Yuan, San Jose, CA (US)

(73) Assignee: Ericsson AB, Stockholm (SE)

( * ) Notice: Subject to any disclaimer, the term of this patent is extended or adjusted under 35 U.S.C. 154(b) by 740 days.

(21) Appl. No.: 11/035,994

(22) Filed: Jan. 14, 2005

(65) Prior Publication Data

US 2005/0174989 A1 Aug. 11, 2005

Related U.S. Application Data

(60) Provisional application No. 60/543,414, filed on Feb. 5, 2004.

(51) Int. Cl.
*H04L 12/28* (2006.01)
(52) U.S. Cl. .......................................... 370/351; 370/238
(58) Field of Classification Search .................. 370/351, 370/389, 412, 235, 238; 709/238, 201, 224, 709/239, 242
See application file for complete search history.

(56) References Cited

U.S. PATENT DOCUMENTS

| | | | | |
|---|---|---|---|---|
| 3,840,712 A | * | 10/1974 | Oberer et al. ...................... | 379/11 |
| 6,339,595 B1 | * | 1/2002 | Rekhter et al. ................. | 370/392 |
| 6,393,486 B1 | * | 5/2002 | Pelavin et al. ................. | 709/238 |
| 6,910,148 B1 | * | 6/2005 | Ho et al. ............................. | 714/4 |
| 6,938,095 B2 | * | 8/2005 | Basturk et al. ................. | 709/238 |
| 7,075,933 B2 | * | 7/2006 | Aysan ...................... | 370/395.31 |
| 7,295,563 B2 | * | 11/2007 | Hughes ........................... | 370/412 |
| 2002/0165981 A1 | * | 11/2002 | Basturk et al. ................. | 709/242 |
| 2003/0174717 A1 | * | 9/2003 | Zabarski et al. ............... | 370/401 |
| 2004/0006640 A1 | * | 1/2004 | Inderieden et al. ........... | 709/242 |
| 2005/0135256 A1 | * | 6/2005 | Ball et al. ....................... | 370/238 |

OTHER PUBLICATIONS

Y. Rekhter, "RFC 1771 (RFC1771)", A Border Gateway Protocol 4, Mar. 1995, T.J. Watson Research Center, IBM Corp., www.faqs.org/rfcs/rfc1771.html, 44 pages.
James MacFarlane, Network Routing Basics, Understanding IP Routing in Cisco Systems, Wiley Publishing Inc., Indianapolis, IN, 2006, pp. 84-85.
Clare Gough, CCNP Self Study, CCNP BSCI Exam Certification Guide Third Edition, The Official Self Study Test Preparation Guide for the Cisco CCNP BSCI Exam 642-801, 2004 Cisco Press, Indianapolis, IN, pp. ii, and 146-148.

* cited by examiner

*Primary Examiner* — David Oveissi
(74) *Attorney, Agent, or Firm* — Blakely, Sokoloff, Taylor & Zafman LLP

(57) ABSTRACT

A method and an apparatus to select a route in a network device within a networked system have been disclosed. In one embodiment, the method includes receiving at a router in a Border Gateway Protocol (BGP) network a first route entry via local redistribution from a first protocol to BGP and a second route entry from a peer router coupled to the router via the network, wherein the first route entry is received earlier than the second route entry. The method may further include downloading administrative distances of the first and the second route entries to a route information base (RIB) of the router and redistributing the administrative distances from the RIB to a BGP table maintained by a BGP module of the router. In some embodiments, the method further includes selecting one of the first and the second route entries based on their administrative distances.

28 Claims, 5 Drawing Sheets

METHOD AND AN APPARATUS FOR ROUTE SELECTION IN ROUTING PROTOCOLS

This application claims the benefit of U.S. Provisional Application No. 60/543,414, filed on Feb. 5, 2004.

TECHNICAL FIELD

The present invention relates to networked systems, and more particularly, to the route selection of a Border Gateway Protocol (BGP) route on a network device within the networked systems.

BACKGROUND

In a typical networked system, a number of network devices, such as routers, are coupled to each other via a network (e.g., an optical fiber network). Data packets are sent between each other via the network according to a protocol adopted by the network (e.g., interior BGP).

FIG. 1A shows a conventional networked system. The system 1000 includes three routers 1010-1030. The routers 1010-1030 are coupled to each other with an interior BGP (iBGP) network 1100 running among them. The routers 1010-1030 may be referred to as BGP peers of each other. The system 1000 further includes a customer device 1200 coupled to router 1010 and router 1020 via a primary path A 1110 and a backup path B 1120, respectively.

Each of the routers 1010-1030 typically includes a routing and forwarding engine. The transmission of route information to the routing and forwarding engine is referred to as downloading and the transmission of route information from the routing and forwarding engine is referred to as redistribution in this document.

In general, a routing protocol downloads active route entries to a RIB stored in the routing and forwarding engine, which in turn selects a route entry to be forwarded to other network devices in the iBGP network 1100. To select the best route on the routers, some or all of LOCAL_PREF, AS_PATH, MED, and IGP metric of the active route entries are compared. Based on some predetermined criteria, one of the active route entries is selected. The selected route entry is downloaded to the routing and forwarding engine and advertised to other BGP peers in the networked system. It is common to redistribute route entries from other routing protocols, such as Open Shortest Path First (OSPF), Routing Information Protocol (RIP), and static routing, etc., into BGP in order to implement various routing policies. A redistributed route typically has an empty AS_PATH attribute and a zero IGP metric.

However, the interaction of redistributed routes and other BGP routes may be order-dependent, and the BGP route selected can thus be non-deterministic. Consequently, complicated configurations are sometimes used to deploy simple routing requirements (such as primary and backup connections between a network of routers and a customer device).

One common routing setup for a multi-homed customer is to treat one connection as the primary, and another connection as the backup. Consider the example illustrated in FIG. 1, where the primary path is path A 1110 and the backup path is path B 1120. The customer device 1200 is statically routed on the router 1010 and the router 1020, and is redistributed into the iBGP network 1100. On the router 1020, the backup path B 1120 for the customer device 1200 is configured with a less preferred administrative distance than the primary path A 1110.

To get to the router 1020, there are two route entries of two potential BGP paths for the customer device 1200, which include a locally redistributed path associated with the backup path B 1120 and an iBGP path learned from the router 1010 (i.e., the primary path A 1110 via the router 1010). Depending on the order of arrival of the two route entries corresponding to these two paths, the routing behavior of the router 1020 may differ. When the iBGP path from the router 1010 is downloaded to the router 1020 first, the iBGP path would be selected, and then downloaded to the RIB of the router 1020. Due to the more preferred value of the administrative distance, the routing and forwarding engine may select the iBGP path, and thus, the local path B 1120 would serve as a backup and would not be redistributed (assuming that only the active path is redistributed). As a result, the network devices in the network 1100 would converge to the primary path A 1110 on the router 1010.

However, if the iBGP route entry from the router 1010 is downloaded to the router 1020 later than the locally redistributed route entry is, then the two paths are compared for route selection. By default, LOCAL_PREF, AS_PATH, and MED are the same in some conventional routers. However, since the IGP metric of the locally redistributed route entry is usually more favored than the IGP metric of the route entry of the iBGP path, the locally redistributed route entry would be selected to be redistributed to other iBGP peers in the network 1100. As a result, the intended backup path B 1120 is selected as the primary path on the router 1020. Furthermore, the router 1020 may advertise the selected route entry to the rest of the network 1100, and hence, some portions of the network (such as the router 1030) may converge to use the backup path B 1120 from the router 1020 as well.

An existing approach to eliminate the non-deterministic routing behavior of the router 1020 is to configure lower LOCAL_PREF for the redistributed route entries. Some existing approaches further modify any other vendor specific route selection criteria preceding the LOCAL_PREF comparison. However, this approach may increase the operational complexity and cost.

SUMMARY

The present invention includes a method and an apparatus for BGP route selection in a network device in a networked system. In one embodiment, the method includes receiving at a router in a Border Gateway Protocol (BGP) network a first route entry via local redistribution from a first protocol to BGP and a second route entry from a peer router coupled to the router via the network, wherein the first route entry is received earlier than the second route entry. The method may further include downloading administrative distances of the first and the second route entries to a route information base (RIB) of the router and redistributing the administrative distances from the RIB to a BGP table maintained by a BGP module of the router. In some embodiments, the method further includes selecting one of the first and the second route entries based on their administrative distances.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method to select a route in a network device within a networked system is described. In the following description, numerous specific details are set forth. However, it is understood that embodiments of the invention may be practiced without these specific details. In other instances, well-known components, structures, and techniques have not been shown in detail in order not to obscure the understanding of this description.

Figure 1A:
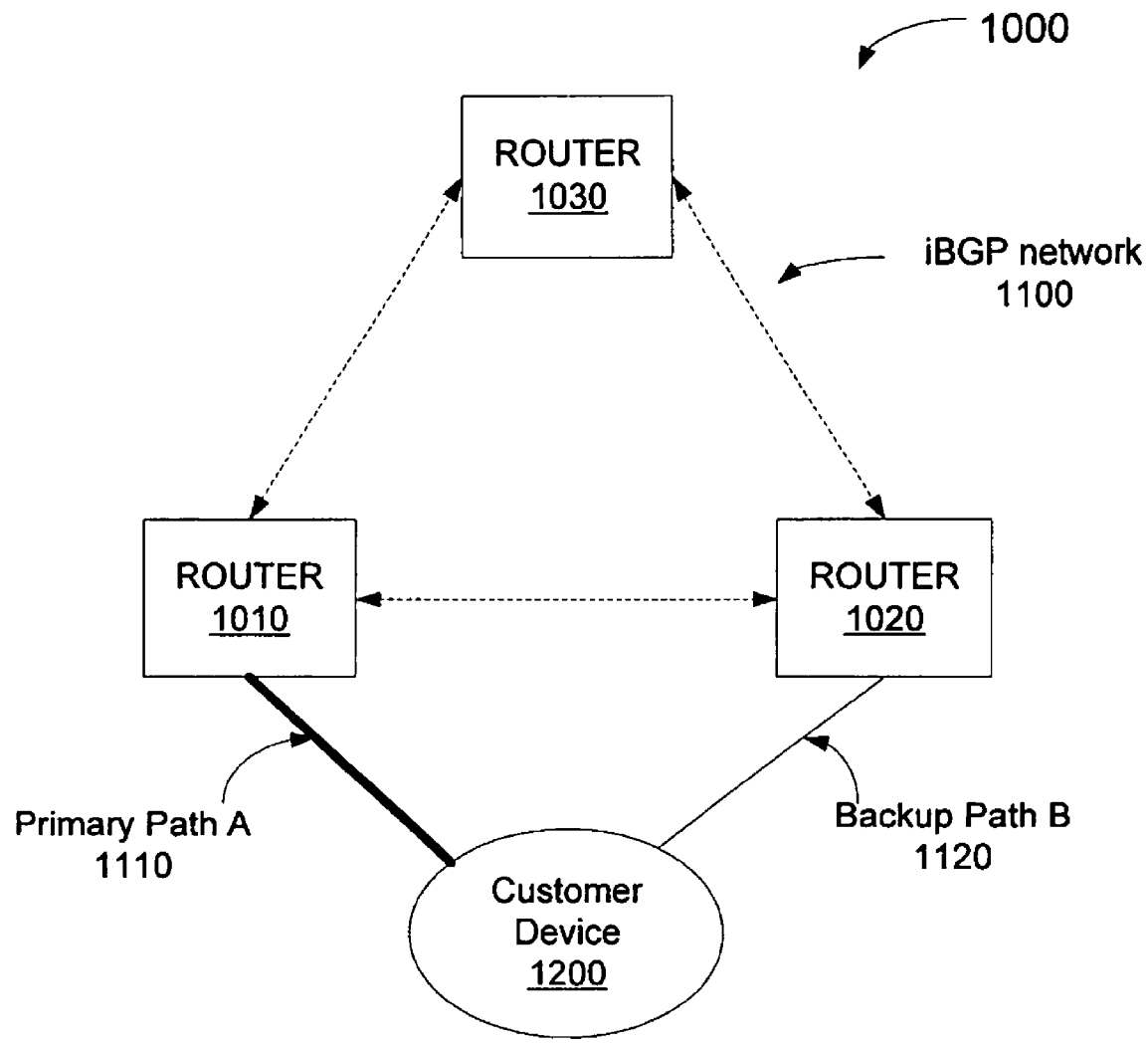
FIG. 1A illustrates an existing networked system.
Figure 1B:
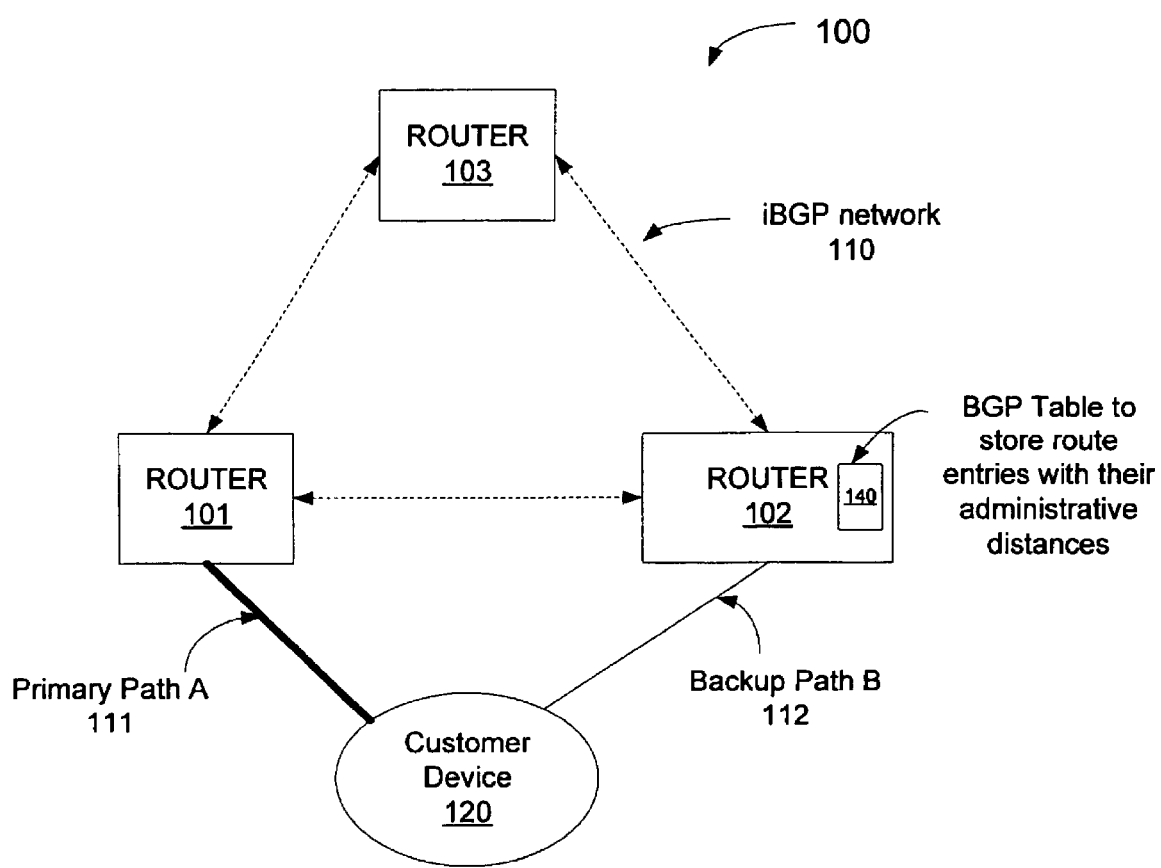
FIG. 1B illustrates an exemplary embodiment of a networked system usable with the invention.

FIG. 1B illustrates one exemplary embodiment of a networked system 100 usable with the invention. The system 100 includes three routers 101-103. The routers 101-103 are coupled to each other via an interior Border Gateway Protocol (iBGP) network 110. In some embodiments, iBGP sessions are maintained between the routers 101-103. A customer device 120 is coupled to the iBGP network 110 via two paths, namely, a primary path A 111 and a backup path B 112. In some embodiments, the router 102 further includes a BGP Table 140 to store route entries as well as the administrative distances of the route entries.

Note that any or all of the components and the associated hardware illustrated in FIG. 1B may be used in various embodiments of the system 100. However, it should be appreciated that other configurations of the system 100 may include more or less devices than those shown in FIG. 1B.

For each of the routers 101-103, the router includes a number of modules to run processes to select a route out of a number of possible routes. Details of the modules in the router are described below with reference to FIG. 2. Route entries corresponding to different possible routes are distributed from one router to another within the iBGP network 110. In one embodiment, a router selects a route entry from the available route entries based on some predetermined criteria. More details of the selection process are discussed below with reference to FIG. 3. However, before going into the details of the selection process, a logical representation of one embodiment of a router is described.

Figure 2:
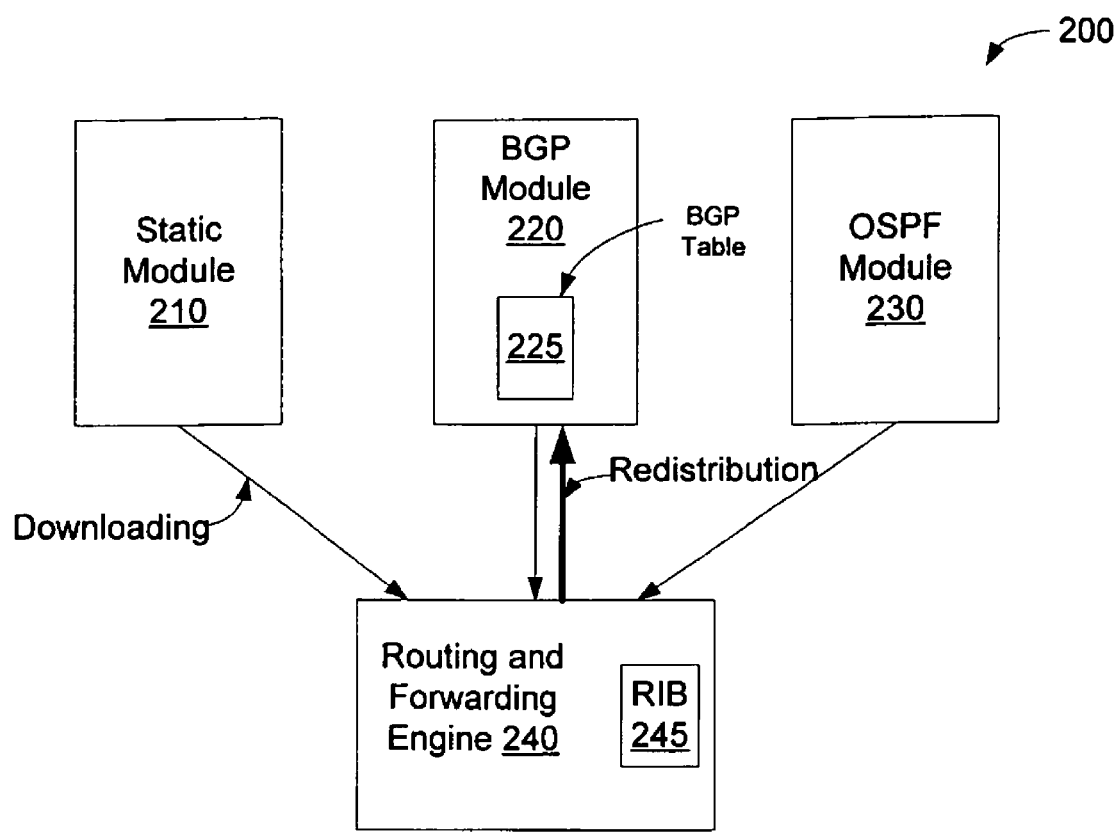
FIG. 2 illustrates an exemplary embodiment of software modules running on an exemplary router.

FIG. 2 illustrates one embodiment of software modules running on an exemplary router 200. The router 200 may include various modules to support different routing protocols. Referring to FIG. 2, a static module 210, a BGP module 220, and an Open Shortest Path First (OSPF) module 230 are shown as examples of such modules. However, one should appreciate that other embodiments of the router 200 are not limited to these modules shown. In some embodiments, the BGP module 220 further includes a BGP Table 225 to store route entries provided from different sources, such as other routers in the iBGP network 110 in FIG. 1B or from local redistribution within the router 200.

Referring to FIG. 2, these modules 210-230 are coupled to a routing and forwarding engine 240. Note that in some embodiments, the routing and forwarding engine 240 may be implemented as two separate modules. As mentioned above, the transmission of route information to the routing and forwarding engine 240 is referred to as downloading and the transmission of route information from the routing and forwarding engine 240 is referred to as redistribution. The routing and forwarding engine 240 may include a route information base (RIB) 245 to store route entries and their administrative distances of the route entries.

Figure 3:
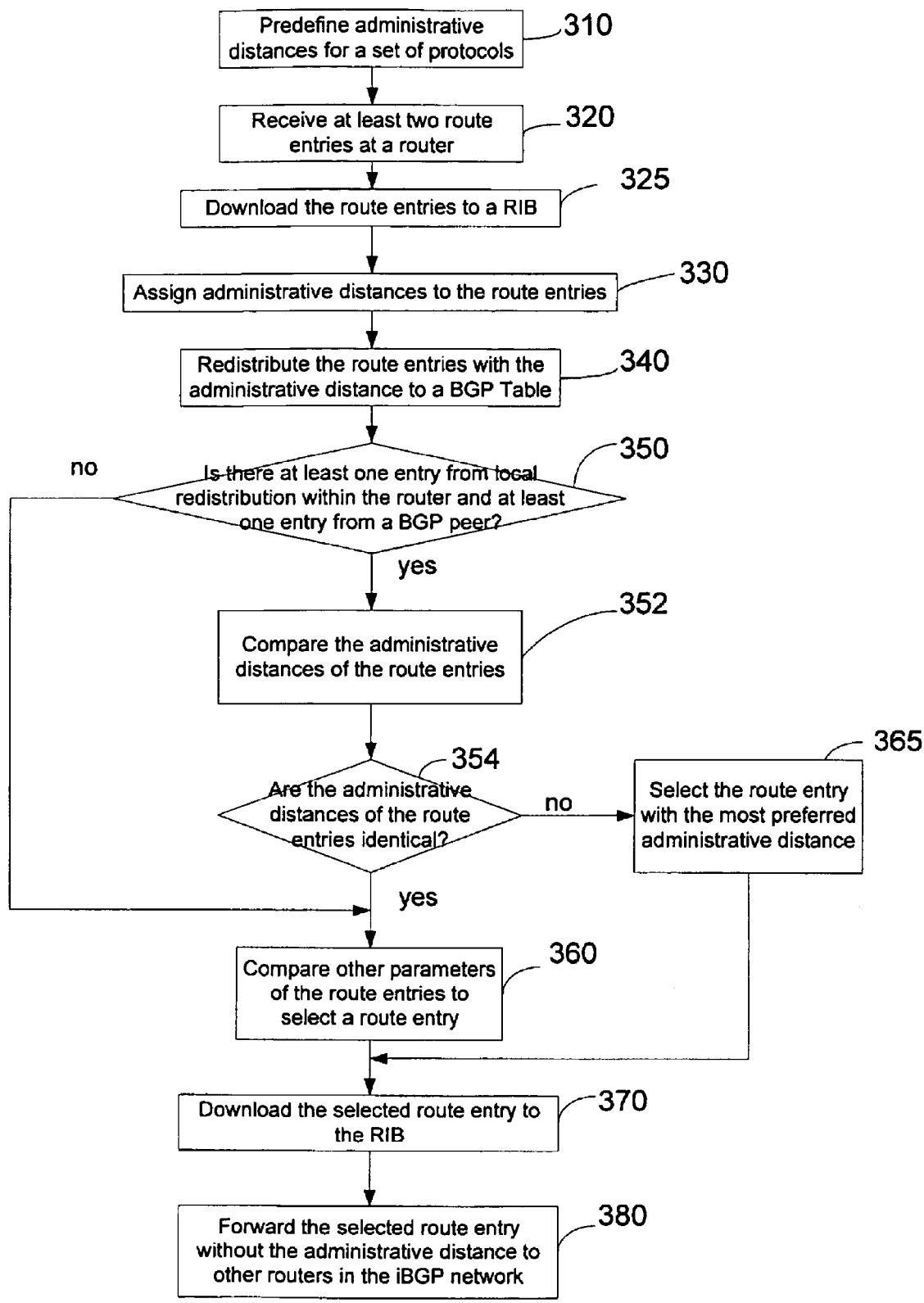
FIG. 3 illustrates a flow diagram of an exemplary embodiment of a process to select a route.

FIG. 3 illustrates a flow diagram of one embodiment of a process to select a BGP route in a networked system. The process is performed by processing logic that may comprise hardware (e.g., circuitry, dedicated logic, etc.), software (such as is run on a general-purpose computer system or a dedicated machine, such as a router), or a combination of both.

Referring to FIG. 3, processing logic initially predefines various administrative distances for a set of protocols (e.g., BGP, OSPF, static connection, etc.) locally within a router coupled to an iBGP network, such as the router 102 in FIG. 1B (processing block 310). These administrative distances may also be referred to as protocol preferences. Processing logic receives at least two route entries at the router 102 (processing block 320). These route entries may be downloaded by different routing protocols to the router 102. Processing logic downloads the route entries to a route information base (RIB) stored in the router 102, such as the RIB 245 in FIG. 2 (processing block 325).

In one embodiment, processing logic assigns an administrative distance to each of the route entries based on the protocol that has downloaded the route entry to the router 102 (processing block 330). Processing logic may store the assigned administrative distances with the route entries in the RIB 245 in FIG. 2. Then processing logic redistributes the route entries with the administrative distance assigned from the RIB 245 to a BGP Table, such as the BGP Table 225 in the BGP module 220 in FIG. 2 (processing block 340).

Then processing logic checks whether there is at least one entry in the BGP Table 225 that is locally redistributed from within the router 102 and at least one entry in the BGP Table 225 from a BGP peer router (e.g., the router 101 in FIG. 1B) (processing block 350). If no, processing logic transitions to processing block 360. If there are such route entries, processing logic compares the administrative distances of the route entries (processing block 352). Then processing logic checks whether the administrative distances of the route entries are identical (processing block 354). Otherwise, processing logic selects the route entry with the most preferred administrative distance (processing block 365). In some embodiments, the most preferred administrative distance is the shortest administrative distance among the administrative distances of the route entries. After selecting the route entry, processing logic transitions to processing block 370. On the other hand, if the administrative distances of the route entries are identical, processing logic transitions to processing block 360.

In processing block 360, processing logic compares other parameter(s) of the route entries in order to select a route entry. In some embodiments, these parameters may include AS_PATH, LOCAL_PREF, MED, and/or IGP metrics, etc. Various criteria may be adopted to select a route entry based on the other parameter(s), such as selecting the route entry with a highest LOCAL_PREF, selecting a route entry with the smallest AS_PATH, etc. Once a route entry is selected, the selected route entry is downloaded to the RIB 245 of the router (processing block 370). Then the selected route entry may be forwarded to other peer routers (e.g., the router 103 in FIG. 1B) in the iBGP network 110 without the corresponding administrative distance because the administrative distance is a local matter within the router 102 (processing block 380). Note that each router within the iBGP network 110 may define its own set of administrative distances for various routing protocols.

By comparing the locally assigned administrative distance before considering other parameters of the available route entries, route entries associated with a predetermined routing protocol with the most favored administrative distance are always preferred over route entries associated with other routing protocols. Thus, processing logic may be able to select the route entries associated with the predetermined routing protocol regardless of the order in which the route entries are downloaded to the router. As a result, the non-deterministic routing behavior of the router may be eliminated. Such technique is more advantageous over the conventional technique (such as modifying some vendor specific route selection criteria, configuring lower LOCAL_PREF for the redistributed route entries, etc.) because this technique does not increase the operational complexity and cost.

To further illustrate the technique described above, consider the following example, which refers to the system 100 in FIG. 1B. Suppose the primary path A 111 has been cut, and hence, the only remaining path to the customer device 120 from the iBGP network 110 is the backup path B 112. As a result, the route entry of the backup path B 112 is redistributed to the BGP Table 140 of the router 102. Suppose the primary path A 111 is recovered later and the route entry of the primary path A 111 is distributed to the RIB of the router 102 from the BGP peer, i.e., the router 101, which is in turn redistributed to the BGP Table 140 of the router 102. Since the BGP Table 140 now has two route entries, one from local redistribution, which corresponds to the backup path B 112, and the other from the router 101, which corresponds to the primary path A 111, processing logic in the router 102 first compares the administrative distances of these two route entries to see if a preferred route entry can be selected out of these two route entries based on their administrative distances.

In some embodiments, the default administrative distance assigned to route entries from an iBGP peer is 200 and the administrative distance assigned to a route entry from local redistribution, which corresponds to a static path, is at least 250. By preferring the lowest administrative distance, processing logic selects the route entry from the iBGP peer. Therefore, processing logic selects the primary path A 111 instead of the backup path B 112. Otherwise, the backup path B 112 may be overloaded quickly.

Figure 4:
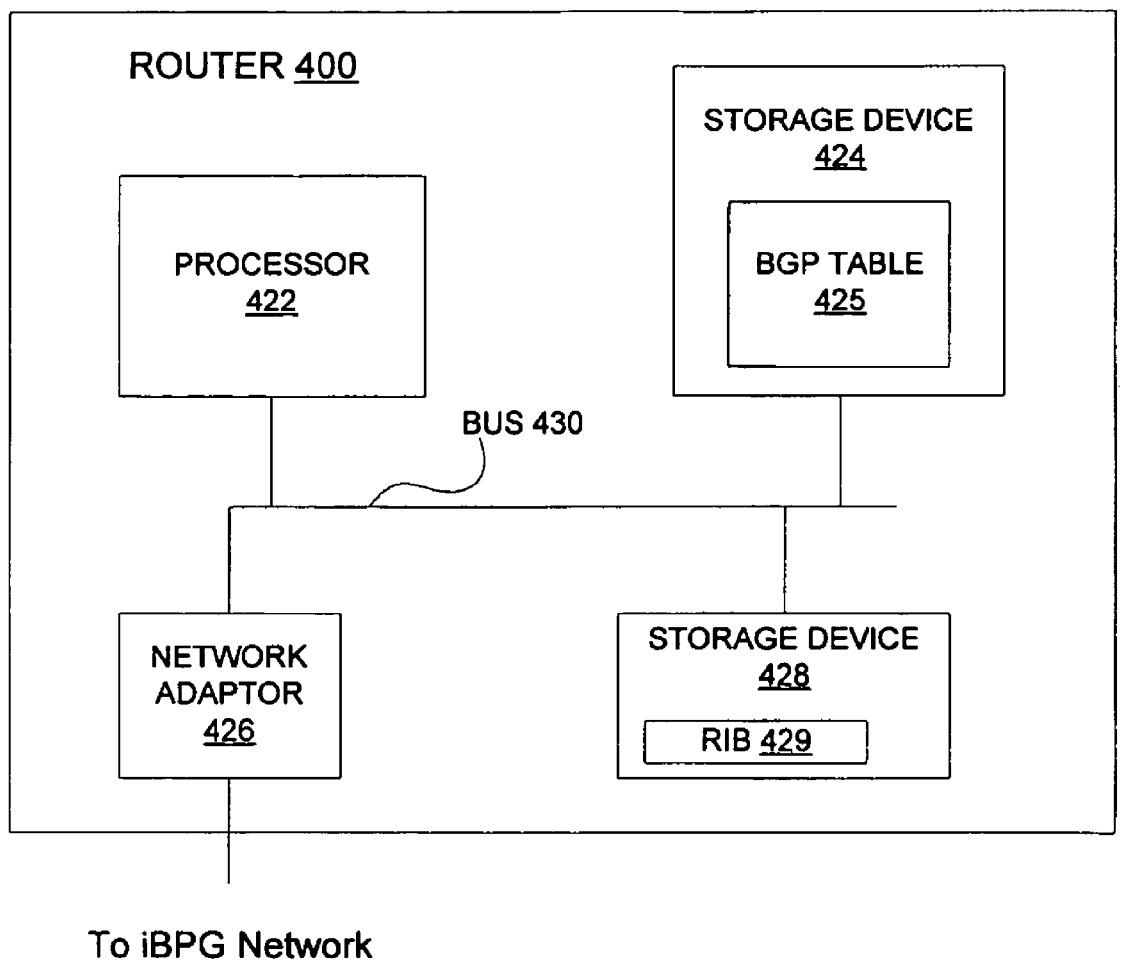
FIG. 4 illustrates an exemplary embodiment of a router.

FIG. 4 illustrates one embodiment of a router in a networked system (e.g., the system 100 in FIG. 1B). The router 400 includes a processor 422, a first storage device 424, a network adaptor 426, and a second storage device 428, which are coupled to each other via a bus 430. In one embodiment, the router 400 is within an iBGP network and the network adaptor 426 interfaces with the iBGP network to communicate with other network devices within the iBGP network.

In one embodiment, the storage device 424 stores a BGP Table 425 to store route entries with their associated administrative distances. The processor 422 may access the route entries in the BGP Table 425 to compare the administrative distances of the route entries, and then other parameter(s) of the route entries if necessary, in order to select a preferred route entry. Details of the route selection process have been described above with reference to FIG. 3.

Referring to FIG. 4, the second storage device 428 may store a route information base (RIB) 429. When various protocols download route entries to the router 400, the route entries may be stored in the RIB 429 before being redistributed to the BGP Table 425. In some embodiments, the first and the second storage devices 424 and 428 may be implemented with a single storage device. Furthermore, the first and the second storage devices 424 and 428 may include any of various types of memory devices, such as, for example, random access memory (RAM), read-only memory (ROM), flash memory, one or more mass storage devices (e.g., disks), etc.

Note that the components of the router 400 shown in FIG. 4 are merely for illustrating the concept. One should appreciate that the router 400 may include more or less components than those shown in FIG. 4 in different embodiments.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A machine-accessible medium includes any mechanism for storing or transmitting information in a form readable by a machine (e.g., a computer). For example, a machine-readable medium includes machine-accessible storage medium (e.g., read only memory ("ROM"); random access memory ("RAM"); magnetic disk storage media; optical storage media; flash memory devices;) or machine-accessible transmission medium such as electrical, optical, acoustical or other form of propagated signals (e.g., carrier waves, infrared signals, digital signals, etc.); etc.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a machine-accessible medium.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method for Border Gateway Protocol (BGP) route selection in a router in a BGP network, comprising:
   receiving a first route entry and a second route entry, wherein the first route entry is received from a BGP peer router and is stored in a BGP table maintained by a BGP module within the router, and wherein the second route entry is received from a routing protocol different than BGP;
   downloading the first route entry from the BGP module to a route information base (RIB); and downloading the second route entry from the routing protocol different than BGP to the RIB;
   processing logic assigning a first administrative distance to the first route entry and processing logic assigning a second administrative distance to the second route entry;
   redistributing the second route entry including the second administrative distance from the RIB of the router to the BGP table;
   selecting, at the BGP module, one of the first and the second route entries to download to the RIB based on their respective administrative distances, wherein selecting the one of the first and second route entries based on their respective administrative distances includes:
      comparing the administrative distances of the first and second route entries, and
      selecting the route entry with a more preferred administrative distances based on a predetermined criterion out of the first and the second route entries; and
   the BGP module downloading the selected entry to the RIB.

2. The method of claim 1, wherein the more preferred administrative distance is the shorter administrative distance among the administrative distances of the first and the second route entries.

3. The method of claim 2, further comprising:
   comparing one or more parameters of the first and the second route entries to determine which one of the first and the second route entries to select after comparing the administrative distances of the first and the second route entries if the administrative distances of the first and the second route entries are identical.

4. The method of claim 3, wherein the one or more parameters include at least one of AS_PATH, LOCAL_PREF, MED, and Interior Gateway Protocol (IGP) metrics.

5. The method of claim 1, further comprising:
   forwarding the selected route entry to one or more other routers within the BGP network without the administrative distance of the selected route entry.

6. The method of claim 1, further comprising:
   the router predefining an administrative distance for each of a plurality of protocols including BGP;
   assigning the administrative distance to the first route entry based on the predefined administrative distance for BGP;
   assigning the administrative distance to the second route entry based on the predefined administrative distance for the routing protocol different than BGP; and
   wherein the administrative distance for the second route entry is redistributed into the BGP table.

7. A non-transitory machine-accessible storage medium that provides instructions that, if executed by a processor, will cause the processor to perform operations for Border Gateway Protocol (BGP) route selection in a router in a BGP network, the operations comprising:
   receiving a first route entry and a second route entry, wherein the first route entry is received from a BGP peer router and is stored in a BGP table maintained by a BGP module within the router, wherein the second route entry is received from a routing protocol different than BGP;
   downloading the first route entry from the BGP module to a route information base (RIB); and downloading the second route entry from the routing protocol different than BGP to the RIB;
   assigning a first administrative distance to the first route entry and assigning a second administrative distance to the second route entry;
   redistributing the second route entry including the second administrative distance from the RIB of the router to the BGP table;
   selecting, at the BGP module, one of the first and the second route entries to download to the RIB based on their respective administrative distances, wherein selecting the one of the first and second route entries based on their respective administrative distances includes:
      comparing the administrative distances of the first and second route entries, and
      selecting the route entry with a more preferred administrative distances based on a predetermined criterion out of the first and the second route entries; and
   the BGP module downloading the selected entry to the RIB.

8. The machine-accessible storage medium of claim 7, wherein the more preferred administrative distance is the shorter administrative distance among the administrative distances of the first and the second route entries.

9. The machine-accessible storage medium of claim 8, wherein the operations further comprise:
   comparing one or more parameters of the first and the second route entries to determine which one of the first and the second route entries to select after comparing the administrative distances of the first and the second route entries if the administrative distances of the first and the second route entries are identical.

10. The machine-accessible storage medium of claim 9, wherein the one or more parameters include at least one of AS_PATH, LOCAL_PREF, MED, and Interior Gateway Protocol (IGP) metrics.

11. The machine-accessible storage medium of claim 7, wherein the operations further comprise:
    forwarding the selected route entry to one or more other routers within the BGP network without the administrative distance of the selected route entry.

12. The machine-accessible storage medium of claim 7, wherein the operations further comprise:
    the router predefining an administrative distance for each of a plurality of protocols including BGP;
    assigning the administrative distance to the first route entry based the predefined administrative distance for BGP;
    assigning the administrative distance to the second route entry based on the predefined administrative distance for the routing protocol different than BGP; and
    wherein the administrative distance for the first route entry is redistributed into the BGP table.

13. An apparatus comprising:
    a first storage device to store a Border Gateway Protocol (BGP) table having a plurality of route entries, wherein at least one of the plurality of route entries is learned from a BGP peer and at least another one of the plurality of route entries is locally redistributed and is of a different routing protocol than BGP, and wherein each of the plurality of route entries is associated with an administrative distance;

a second storage device to store a route information base (RIB); and a processor coupled via a bus to the first storage device and the second storage device, the processor to compare the administrative distances of the plurality of route entries and to select a route entry out of the plurality of route entries that has a most preferred administrative distance to download to the RIB, the processor further to download the selected entry to the RIB.

14. The apparatus of claim 13, further comprising:
wherein the processor is further to download the administrative distances of the plurality of route entries to the RIB when the plurality of route entries are received, and the processor is further to distribute to the BGP table from the RIB the administrative distances of at least those route entries that are to be locally redistributed to the BGP table.

15. The apparatus of claim 13, wherein the most preferred administrative distance is the shortest administrative distance among the administrative distances of the plurality of route entries.

16. The apparatus of claim 13, wherein the processor is operable to further compare one or more parameters of the plurality of route entries if the processor does not find the most preferred administrative distance among the administrative distances of the plurality of route entries.

17. The apparatus of claim 16, wherein the one or more parameters include at least one of AS_PATH, LOCAL_PREF, MED, and Interior Gateway Protocol (IGP) metrics.

18. The apparatus of claim 13, further comprising:
a network interface to be coupled to one or more routers via a BGP network to forward the selected route entry to the one or more routers.

19. A system comprising:
an interior Border Gateway Protocol (iBGP) network;
a first router coupled to the BGP network;
a second router coupled to the first router via the BGP network, wherein iBGP sessions are maintained between the first and the second routers; and
a customer device coupled to the first router via a first path and the second router via a second path, wherein the first path is a primary path and the second path is a backup path, and wherein the second router comprises:
a first storage device to store a Border Gateway Protocol (BGP) table having a route entry of the first path and a second route entry of the second path, wherein the first path is learned from the first router through BGP and the second path is learned from local redistribution, and wherein each of the first and the second route entries is associated with an administrative distance;
a second storage device to store a route information base (RIB); and
a processor coupled via a bus to the first storage device and the second storage device, the processor to compare the administrative distances of the first and the second route entries and to select a route entry out of the first and second route entries that has a most preferred administrative distance to download to the RIB, the processor further to download the selected entry to the RIB.

20. The system of claim 19, wherein the second router further comprises:
wherein the processor is further to download the administrative distances of the first and the second route entries to the RIB when the first and the second route entries are received, and the processor is further to distribute the administrative distances to the BGP table from the RIB.

21. The system of claim 19, wherein the most preferred administrative distance is the shortest administrative distance among the administrative distances of the first and the second route entries.

22. The system of claim 19, wherein the processor is operable to further compare one or more parameters of the first and the second route entries if the processor does not find the most preferred administrative distance among the administrative distances of the first and the second route entries.

23. The system of claim 22, wherein the one or more parameters include at least one of AS_PATH, LOCAL_PREF, MED, and Interior Gateway Protocol (IGP) metrics.

24. The system of claim 19, wherein the second router further comprises:
a network interface to be coupled to one or more routers via the iBGP network to forward the selected route entry to the one or more routers.

25. A method comprising:
maintaining in a router a primary path from a Border Gateway Protocol (BGP) peer router over a secondary path from another routing protocol, the maintaining including,
locally assigning an administrative distance to a plurality of routing protocols, wherein the plurality of routing protocols includes BGP and a plurality of other routing protocols, and wherein the administrative distance assigned to BGP is such that BGP will be selected over the plurality of other routing protocols,
downloading routes from at least two of the plurality of other routing protocols to a route information base (RIB) of the forwarding and routing engine, wherein each such route has associated with it the administrative distance locally assigned to the one of the plurality of other routing protocols that downloaded that route;
redistributing, from the RIB of the forwarding and routing engine to the BGP module in the router, routes from the plurality of other protocols including the administrative distances associated with those routes; and
selecting, by the BGP module, routes for downloading to the RIB of the forwarding and routing engine based at least on a most preferred administrative distance associated with those routes.

26. The method of claim 25, further comprising:
downloading the selected routes to the forwarding and routing engine; and
forwarding the downloaded routes to one or more other routers within a BGP network coupled to the router.

27. A non-transitory machine-accessible storage medium that provides instructions that, if executed by a processor, will cause the processor to perform operations comprising:
maintaining in a router a primary path from a Border Gateway Protocol (BGP) peer router over a secondary path from another routing protocol, the maintaining including,
locally assigning an administrative distance to a plurality of routing protocols, wherein the plurality of routing protocols includes BGP and a plurality of other routing protocols, and wherein the administrative distance assigned to BGP is such that BGP will be selected over the others of the plurality of routing protocols,
downloading routes from at least two of the plurality of other routing protocols to a route information base (RIB) of the forwarding and routing engine, wherein each such route has associated with it the administrative distance locally assigned to the one of the plurality of other routing protocols that downloaded that route;

redistributing, from the RIB of the forwarding and routing engine to the BGP module in the router routes from the plurality of other protocols including the administrative distances associated with those routes; and selecting, by the BGP module, routes for downloading to the RIB of the forwarding and routing engine based at least on a most preferred administrative distance associated with those routes.

28. The non-transitory machine-accessible storage medium of claim 27, wherein the operations further comprise:

downloading the selected routes to the forwarding and routing engine; and forwarding the downloaded routes to one or more other routers within a BGP network coupled to the router.

* * * * *

UNITED STATES PATENT AND TRADEMARK OFFICE
CERTIFICATE OF CORRECTION

PATENT NO. : 8,265,058 B2
APPLICATION NO. : 11/035994
DATED : September 11, 2012
INVENTOR(S) : Chen et al.

Page 1 of 1

It is certified that error appears in the above-identified patent and that said Letters Patent is hereby corrected as shown below:

In Fig. 4, Sheet 5 of 5, delete "iBPG" and insert -- iBGP --, therefor.

In Column 6, Line 39, delete "devices;)" and insert -- devices) --, therefor.

In Column 8, Line 56, in Claim 12, delete "based" and insert -- based on --, therefor.

Signed and Sealed this
Eighteenth Day of December, 2012

David J. Kappos
*Director of the United States Patent and Trademark Office*